United States Patent
Qussar et al.

(10) Patent No.: US 9,204,750 B1
(45) Date of Patent: Dec. 8, 2015

(54) ELECTRIC HAND HELD FRUIT AND VEGETABLE CORING DEVICE

(71) Applicants: Louis Qussar, Littleton, CO (US); Naomi Qussar, Littleton, CO (US)

(72) Inventors: Louis Qussar, Littleton, CO (US); Naomi Qussar, Littleton, CO (US)

( * ) Notice: Subject to any disclaimer, the term of this patent is extended or adjusted under 35 U.S.C. 154(b) by 0 days.

(21) Appl. No.: 14/478,853

(22) Filed: Sep. 5, 2014

(51) Int. Cl.
*B23B 31/00* (2006.01)
*A47J 25/00* (2006.01)

(52) U.S. Cl.
CPC ............ *A47J 25/00* (2013.01); *B23B 31/00* (2013.01); *Y10T 408/95* (2015.01)

(58) Field of Classification Search
CPC .................................. A47J 25/00; A47J 23/00
USPC ....... 408/240, 239 R, 226, 124; 279/29, 23.1, 279/79; 30/113.1–113.3; 99/547, 551; 173/217; 310/50
See application file for complete search history.

(56) References Cited

U.S. PATENT DOCUMENTS

| | | | | |
|---|---|---|---|---|
| 2,211,216 A | * | 8/1940 | Oster | 451/358 |
| 3,780,435 A | | 12/1973 | Farha et al. | |
| 3,899,852 A | * | 8/1975 | Batson | 451/359 |
| 4,649,919 A | * | 3/1987 | Thimsen et al. | 606/80 |
| 4,710,075 A | * | 12/1987 | Davison | 408/202 |
| 5,852,875 A | | 12/1998 | Dolah | |
| 6,102,632 A | * | 8/2000 | Potter et al. | 408/124 |
| 6,269,888 B1 | * | 8/2001 | Schuda et al. | 173/48 |
| 6,640,445 B1 | * | 11/2003 | Crawford | 30/277.4 |
| 6,769,186 B1 | | 8/2004 | Sakhleh et al. | |
| 6,810,970 B1 | * | 11/2004 | Kraenzler et al. | 173/217 |
| 7,020,968 B1 | | 4/2006 | Abdel-Dayem | |
| 2006/0088393 A1 | * | 4/2006 | Cooper | 408/239 R |
| 2012/0265095 A1 | * | 10/2012 | Fiebig | 600/567 |

* cited by examiner

*Primary Examiner* — Daniel Howell
*Assistant Examiner* — Nicole N Ramos
(74) *Attorney, Agent, or Firm* — Crossley Patent Law

(57) ABSTRACT

An electric hand held fruit and vegetable coring device having a cylindrical sealed tube, with a plurality of quickly changeable augers, the augers providing varied bits and tips, the augers affixed to a constant diameter shaft with detent, the detent quickly engaged with the cupped sleeve and disengaged from the cupped sleeve that is driven by the motor, the progressively activated switch and motor providing a progression from on, to speeds increased by steps, to off, the power pack removable, the power pack, progressively activated switch, motor, cupped sleeve, and auger receipt providing a balanced ergonomic advantage for a user.

1 Claim, 4 Drawing Sheets

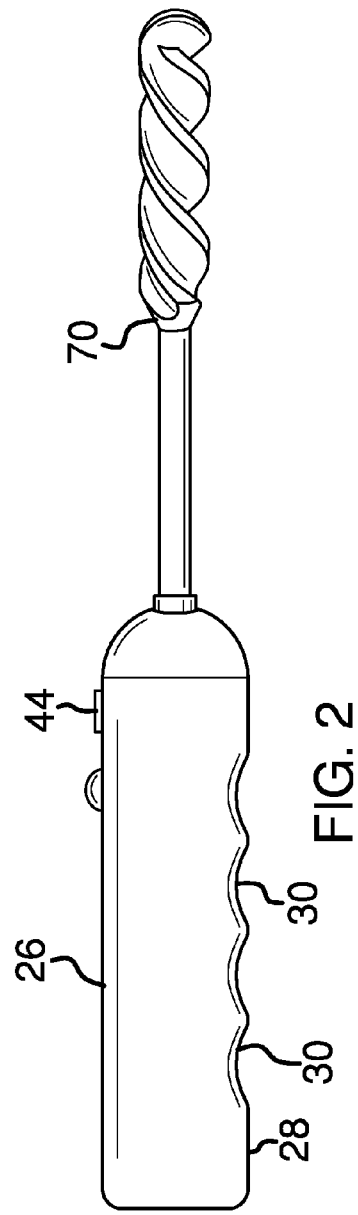
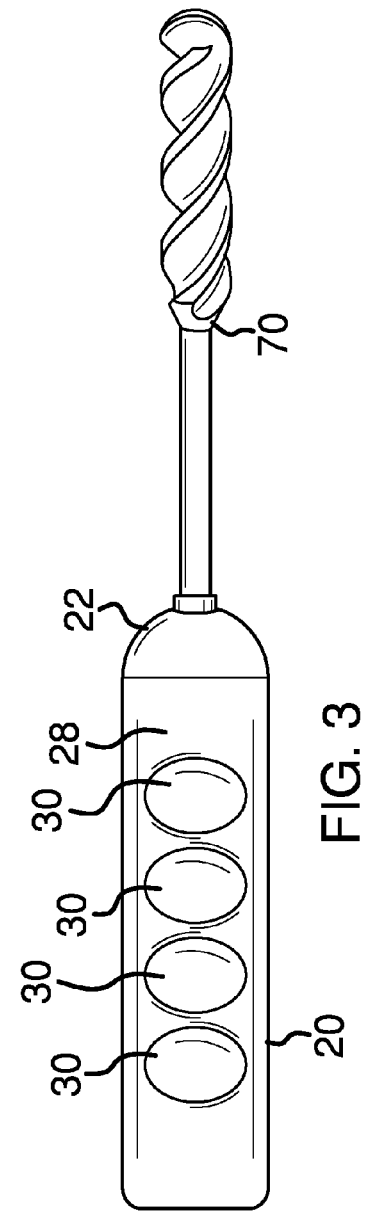

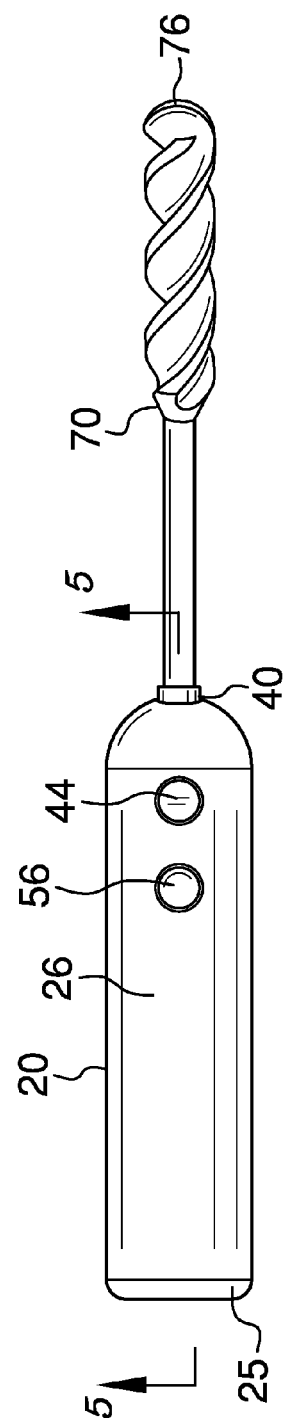
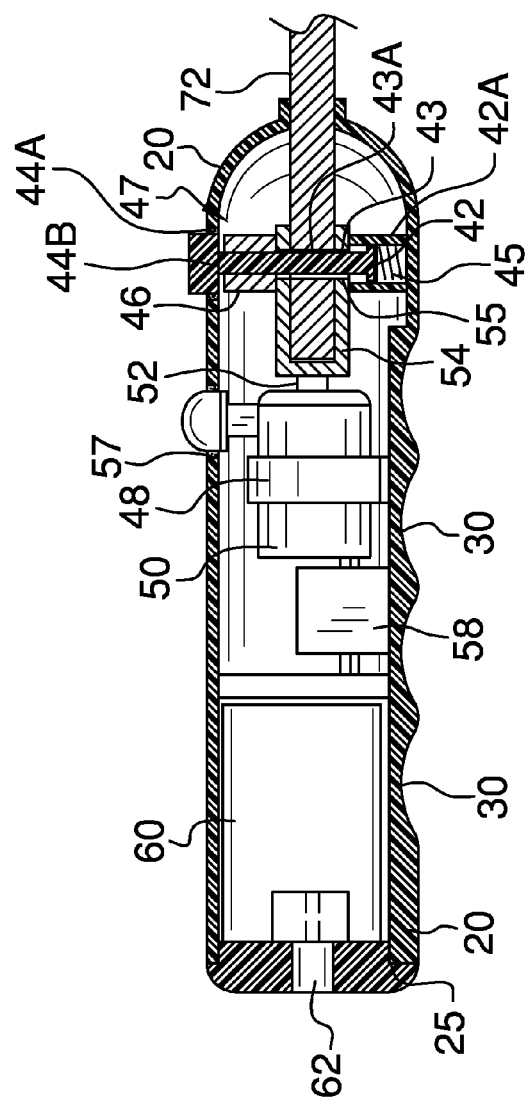
FIG. 4
FIG. 5

ELECTRIC HAND HELD FRUIT AND VEGETABLE CORING DEVICE

BACKGROUND OF THE INVENTION

Various types of hand held fruit and vegetable coring devices are known in the prior art. While each has individually attractive features none provide the combined features and new features of the current device. What is needed is an electric hand held fruit and vegetable coring device that is completely sealed against foreign material invasion, a device with a power pack that need not be removed for charging, a device that provides a sure grip to combat possible torque, a device that provides a variety of coring augers that are easily and quickly changed, and a device that provides a plurality of speeds via a progressively activated switch commanded by a single control button. The present device provides these needed features.

FIELD OF THE INVENTION

The present invention relates to fruit and vegetable coring devices, and more especially to an electric hand held fruit and vegetable coring device.

SUMMARY OF THE INVENTION

The general purpose of the electric hand held fruit and vegetable coring device, described subsequently in greater detail, is to provide an electric hand held fruit and vegetable coring device that has many novel features that result in an electric hand held fruit and vegetable coring device which is not anticipated, rendered obvious, suggested, or even implied by prior art, either alone or in combination thereof.

To accomplish this, the electric hand held fruit and vegetable coring device comprises a cylindrical sealed tube having a rounded first end spaced apart from a second end, and a top side spaced apart from a bottom side. A removable cap is disposed on the second end. The removable cap and tube are sealed with cap application. A plurality of finger grips is disposed on the bottom side. The finger grips ensure a positive hold on the tube in potentially torqued use.

A sealed bushing is disposed in the first end. A spring loaded keeper is disposed in the tube proximal the first end. The keeper further comprises a housing. A disc is movably disposed within the housing. A projection is disposed on the disc, the projection facing a central interior of the tube. A first compression spring is disposed within the housing between the disc and an interior of the tube. The first compression spring is configured to force the disc and therefore the projection toward the central interior of the tube.

A spring loaded release is disposed in the tube. The release is diametrically opposed to the keeper. The release comprises a tab slidably disposed in the tube. An arm is disposed on the tab.

The arm is extended toward the central interior of the tube. A bracket is disposed within the tube. A motor is disposed approximately centrally within the bracket. An output shaft is disposed within the motor and extended therefrom toward the first end. A cupped sleeve is disposed on the output shaft. The cupped sleeve openly faces the first end. The cupped sleeve is perforated by a hole passed through the cupped sleeve at a perpendicular to the output shaft. A second compression spring is disposed around the arm. The second compression spring thereby abuts the cupped sleeve and the tab. A sealed control button is disposed on the top side.

A plurality of seals is provided. A first of the plurality of seals is continuously disposed around the release, and a second of the plurality of seals is continuously disposed around the control button. A progressively activated switch is disposed within the tube, most proximal to the second end. The motor, the progressively activated switch, and the control button are in operational communication. Having the switch commanded by the control button in order to instruct the motor is advantageous to longevity of the device. A typical approach would often direct power and switching through the control button which subjects a control button to higher levels of amperage and voltage, these two practices often leading electrical devices to premature failure. The current device avoids this pitfall in order to extend longevity. Progressively pushing the control button provides for the progressively activated switch to turn the motor on a low speed followed by a plurality of elevations to higher speeds followed by an off.

A rechargeable power pack is disposed within the tube adjacent the second end. The motor, the control button, the progressively activated switch, and the power pack are in operational communication. A port is disposed in the second end. The port is in operational communication with the power pack. A power cord with jack is selectively inserted into the port. A plurality of differing augers is provided. Each auger comprises a constant diameter shaft with a bit with a tip. Regarding the keeper and the release, the projection removably fits into the aperture.

Each shaft is selectively rotatably disposed through the sealed bushing and selectively retained within the cupped sleeve via the projection passed into the aperture. Each shaft is selectively released from the cupped sleeve by the arm forcing the projection out of the aperture by a user pressure on the tab. A release of user pressure on the tab allows the return of the arm away from the cupped sleeve via force provided by the second compression spring. With the arm removed from the aperture, the shaft is pulled slightly from the cupped sleeve. This shaft outward movement prevents reentry of the projection into the aperture.

The tube is completely sealed, as operating with vegetables and fruits can be messy. Invasion of foreign matter into the tube would result in premature failure of the device. It is also important that the cap removably fitted to the second end provides for changing the power pack, as such components are prone to failure after a period of time. Quick changing of attachments provided by the keeper and the release is also an important feature. A positioning of the sealed bushing, the keeper and the release, the motor, the progressively activated switch, and the power pack are important in providing an in use balance to the device that ergonomically aids a user.

Thus has been broadly outlined the more important features of the present electric hand held fruit and vegetable coring device so that the detailed description thereof that follows may be better understood and in order that the present contribution to the art may be better appreciated.

BRIEF DESCRIPTION OF THE DRAWINGS

Figures

FIG. 2 is a lateral elevation view.
FIG. 3 is a bottom plan view.
FIG. 4 is a top plan view.
FIG. 5 is a lateral cross sectional view.

DETAILED DESCRIPTION OF THE DRAWINGS

Figure 1:
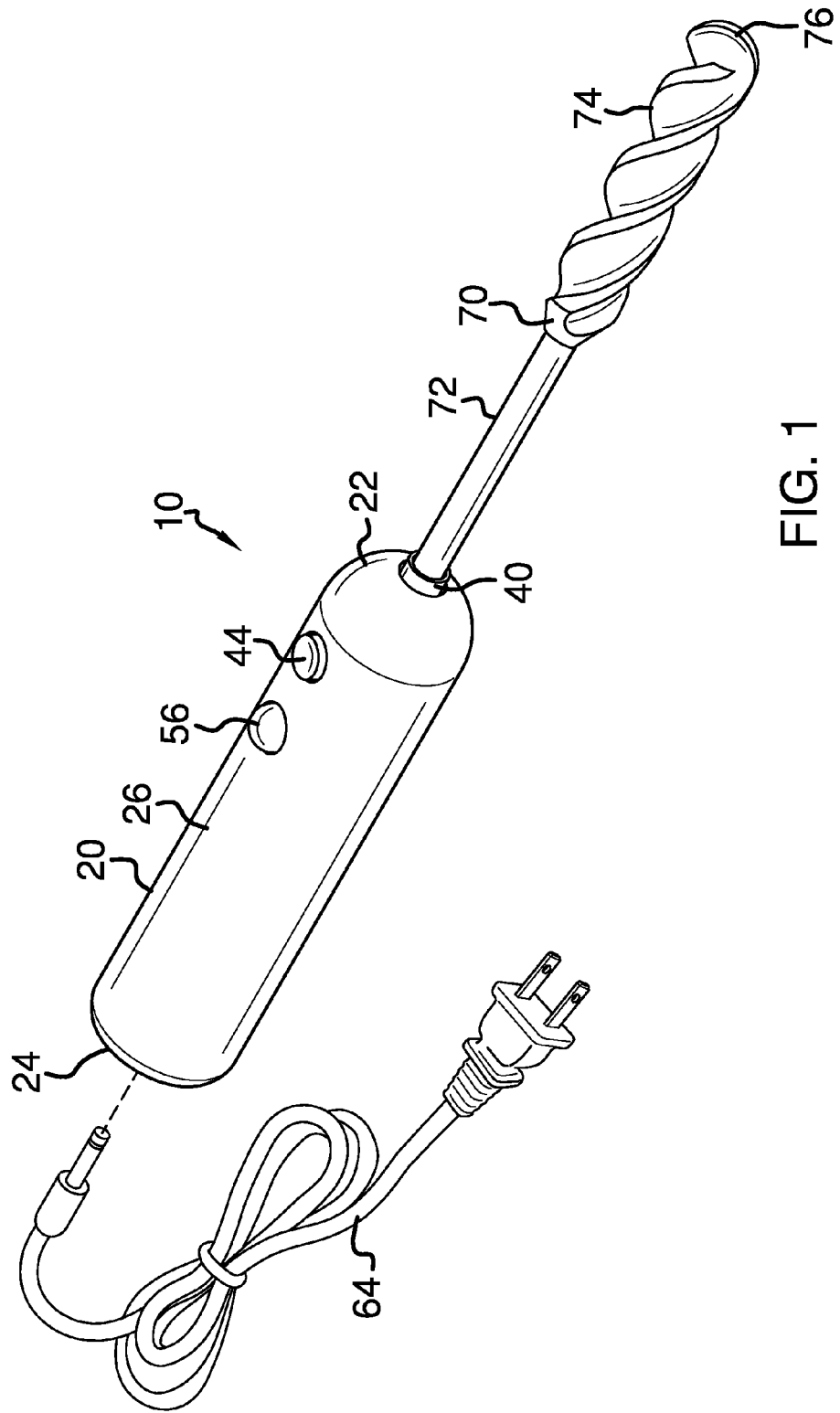
FIG. 1 is a top side first end perspective view.
Figure 6:
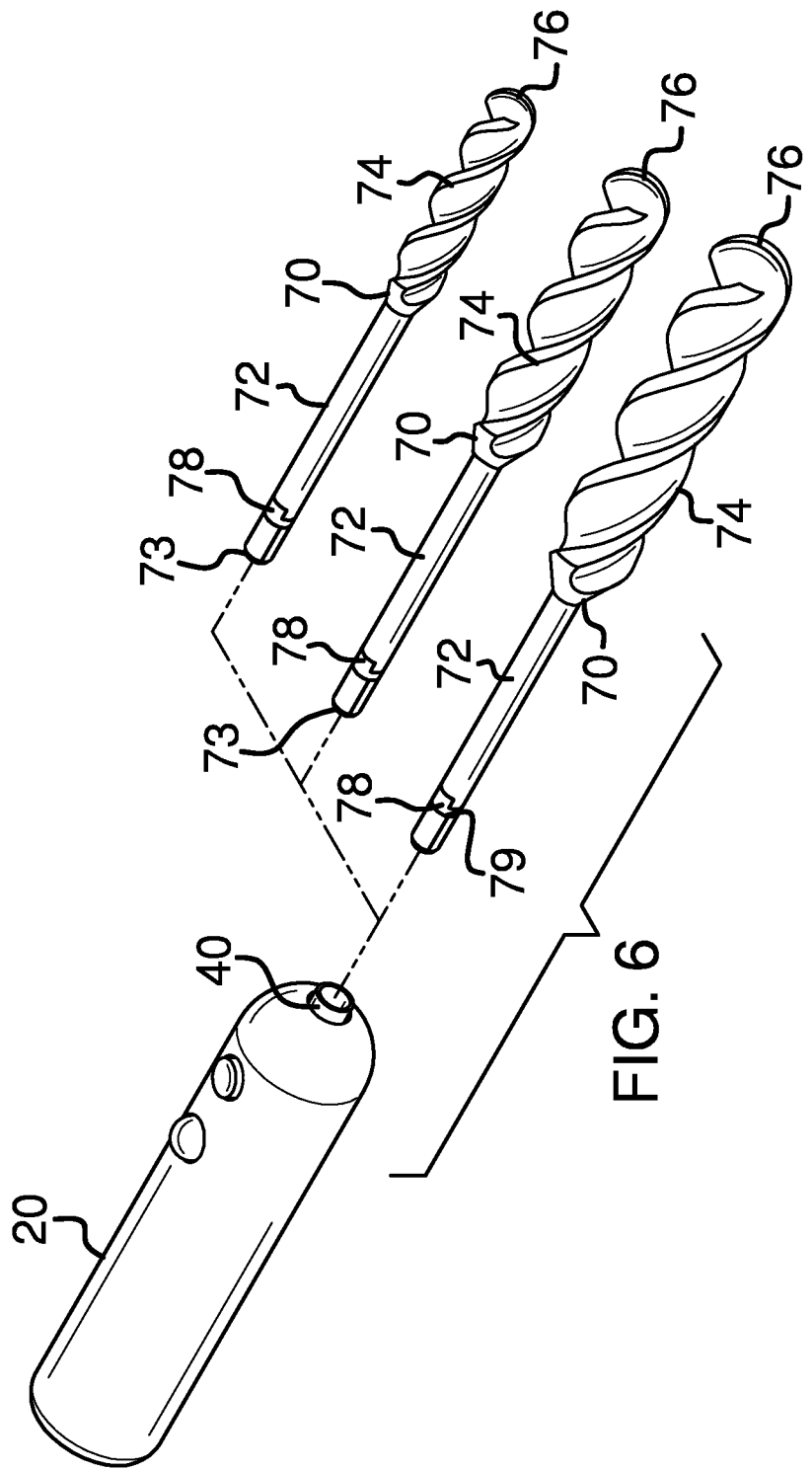
FIG. 6 is a first end perspective view of a cylindrical sealed tube and a plurality of augers.

With reference now to the drawings, and in particular FIGS. 1 through 6 thereof, an example of the electric hand held fruit and vegetable coring device employing the principles and concepts of the present electric hand held fruit and vegetable coring device and generally designated by the reference number 10 will be described.

Referring to FIGS. 1 through 6, the electric hand held fruit and vegetable coring device 10 comprises a cylindrical sealed tube 20 having a rounded first end 22 spaced apart from a second end 24, and a top side 26 spaced apart from a bottom side 28. A removable cap 25 is disposed on the second end 24. A plurality of finger grips 30 is disposed on the bottom side 28.

A sealed bushing 40 is disposed in the first end 22. A spring loaded keeper 42 is disposed in the tube 20 proximal the first end 24. The keeper 42 further comprises a housing 42A. A disc 43 is movably disposed within the housing 42A. A projection 43A is disposed on the disc 43, the projection 43A facing a central interior of the tube 20. A first compression spring 45 is disposed within the housing 42A between the disc 43 and an interior of the tube 20. The first compression spring 45 is configured to force the disc 43 and therefore the projection 43A toward the central interior of the tube 20.

A spring loaded release 44 is disposed in the tube 20. The release 44 is diametrically opposed to the keeper 42. The release 44 comprises a tab 44A slidably disposed in the tube 20. A stop 47 is extended tangentially from the tab, the stop 47 disposed within the interior of the tube 20. An arm 44B is disposed on the tab 44A. The arm 44B is extended toward the central interior of the tube 20.

A bracket 48 is disposed approximately centrally disposed within the tube 20. A motor 50 is disposed approximately centrally within the bracket 48. An output shaft 52 is disposed within the motor 50 and extended therefrom toward the first end 22. A cupped sleeve 54 is disposed on the output shaft 52. The cupped sleeve 54 openly faces the first end 22. The cupped sleeve 54 is perforated by a hole 55 passed through the cupped sleeve 54 at a perpendicular to the output shaft 52. A second compression spring 46 is disposed around the arm 44B. The second compression spring 46 abuts the cupped sleeve 54 and the tab 44A. A sealed control button 56 is disposed on the top side 26.

A plurality of seals 57 is provided. A first 80 of the plurality of seals 57 is continuously disposed around the release 44, and a second 82 of the plurality of seals 57 is continuously disposed around the control button 56. A progressively activated switch 58 is disposed within the tube 20, most proximal to the second end 24. The motor 50, the progressively activated switch 58, and the control button 56 are in operational communication. Progressively pushing the control button 56 is configured to progressively activate switch 58 to turn the motor 50 on a low speed followed by a plurality of elevations to higher speeds followed by an off.

A rechargeable power pack 60 is disposed within the tube 20 adjacent the second end 24. The motor 50, the control button 56, the progressively activated switch 58, and the power pack 60 are in operational communication. A port 62 is disposed in the second end 24. The port 62 is in operational communication with the power pack 60. A power cord with jack 64 is selectively inserted into the port 62. A plurality of differing augers 70 is provided. Each auger 70 comprises a constant diameter shaft 72 with a bit 74 with a tip 76. Regarding the keeper 42 and the release 44, the projection 43A removably fits into the aperture 79.

Each shaft 72 is selectively rotatably disposed through the sealed bushing 40 and selectively retained within the cupped sleeve 54 via the projection 43 passed into the aperture. Each shaft 72 is selectively released from the cupped sleeve 54 by the arm 44B forcing the projection 43A out of the aperture 79 by a user pressure on the tab 44A. User pressure on the tab 44A is resisted by the second compression spring that is fitted between the tab 44A and the cupped sleeve 54. A release of user pressure on the tab 44A allows the return of the arm away from the cupped sleeve 54 via force provided by the second compression spring 46. With the arm 44B removed from the aperture 79, the shaft 72 is pulled slightly from the cupped sleeve 54. This shaft 72 outward movement prevents reentry of the projection 43A into the aperture 79. A release of user pressure on the tab 44A allows the arm 44B to automatically release by action of the second compression spring 46. The stop 47 prevents tab 44A exit from the tube 20.

What is claimed is:

1. An electric hand held fruit and vegetable coring device comprising:
    a cylindrical sealed tube having a rounded first end spaced apart from a second end, a top side spaced apart from a bottom side;
    a plurality of finger grips disposed on the bottom side;
    a sealed bushing disposed in the first end;
    a spring loaded keeper disposed within the tube proximal the first end, the keeper further comprising:
        a housing,
        a disc movably disposed within the housing;
        a projection disposed on the disc, the projection facing a central interior of the tube;
        a first compression spring disposed within the housing between the disc and an interior of the tube;
    a spring loaded release disposed within the tube, the release diametrically opposed to the keeper, the release comprising;
        a tab slidably disposed in the tube;
        a stop extended tangentially from the tab, the stop abutting the interior of the tube in preventing a tab exit from the tube;
        an arm disposed on the tab, the arm extended toward the central interior of the tube;
        a second compression spring disposed against the tab, the second compression spring extended toward the central interior of the tube;
    a bracket disposed approximately centrally within the tube;
    a motor disposed approximately centrally within the bracket;
    an output shaft disposed within the motor, the output shaft extended therefrom toward the first end;
    a cupped sleeve disposed on the output shaft, the cupped sleeve partially comprising a hole, the hole passed through at a perpendicular to the output shaft, the cupped sleeve openly facing the first end, the second compression spring abutting the cupped sleeve and the tab;
    wherein a pressure is exerted against the tab;
    a sealed control button disposed on the top side;
    a plurality of seals, wherein a first of the plurality of seals is continuously disposed around the release and a second of the plurality of seals is continuously disposed around the control button;
    a progressively activated switch disposed within the tube, most proximal to the second end;

wherein a repeated press of the control button is configured to turn the motor on a low speed followed by a plurality of elevations to higher speeds followed by an off;

a rechargeable power pack disposed within the tube adjacent the second end;

wherein the motor, the control button, the progressively activated switch, and the power pack are in operational communication;

a port disposed in the second end, the port in operational communication with the power pack;

a power cord having a jack selectively inserted into the port; and a plurality of augers, each auger comprising a constant diameter shaft with a rounded terminus, bit with a tip;

wherein each shaft is rotatably disposed within the sealed bushing and selectively retained within the cupped sleeve by the keeper; and wherein each shaft is selectively released from the cupped sleeve by the release.

* * * * *